US006540925B2

United States Patent
Takahashi et al.

(10) Patent No.: US 6,540,925 B2
(45) Date of Patent: Apr. 1, 2003

(54) OIL RECOVERY METHOD AND OIL RECOVERY APPARATUS

(75) Inventors: Shinjiro Takahashi, Monbetsu (JP); Katsuyuki Maida, Monbetsu (JP); Hiroshi Saeki, Sapporo (JP)

(73) Assignee: Nishimuragumi Co., Ltd. (JP)

( * ) Notice: Subject to any disclaimer, the term of this patent is extended or adjusted under 35 U.S.C. 154(b) by 46 days.

(21) Appl. No.: 09/844,214

(22) Filed: Apr. 27, 2001

(65) Prior Publication Data

US 2001/0037983 A1 Nov. 8, 2001

(30) Foreign Application Priority Data

Apr. 28, 2000 (JP) .......................... 2000-131323

(51) Int. Cl.7 .......................... E02B 15/00; E02B 15/04
(52) U.S. Cl. .................. 210/776; 210/800; 210/237; 210/242.3; 210/251; 210/923; 37/307; 37/340; 37/341; 37/398; 37/461
(58) Field of Search ................. 210/776, 800, 210/923, 513, 237, 241.1, 242.3, 244, 248, 251; 37/307, 340, 341, 398, 461, 184

(56) References Cited

U.S. PATENT DOCUMENTS

| | | | | |
|---|---|---|---|---|
| 2,765,105 A | * | 10/1956 | Sullivan | |
| 4,758,355 A | * | 7/1988 | Levine | 210/747 |
| 4,778,211 A | * | 10/1988 | Gabriel | 37/185 |
| 4,840,729 A | * | 6/1989 | Levine | 210/170 |
| 4,934,420 A | * | 6/1990 | Radna | 99/495 |
| 5,478,478 A | * | 12/1995 | Griswold | 210/745 |
| 5,584,238 A | * | 12/1996 | Newton, Sr. | 99/495 |
| 6,105,788 A | * | 8/2000 | Williamson et al. | 210/489 |

\* cited by examiner

*Primary Examiner*—Robert J. Popovics
(74) *Attorney, Agent, or Firm*—Adams & Wilks

(57) ABSTRACT

An apparatus for recovering oil has a bucket for skimming and collecting water and oil floating on the surface of the water. The bucket has a base plate having apertures for draining water collected by the bucket. The apertures have a preselected diameter and length to allow separation of the oil and water utilizing differences in specific gravities and viscosities of the oil and water so that the oil can be discharged from the bucket into an oil recovery tank after the water drains out of the bucket through the apertures but before the oil begins to drain out of the apertures.

8 Claims, 8 Drawing Sheets

OIL RECOVERY METHOD AND OIL RECOVERY APPARATUS

BACKGROUND OF THE INVENTION

1. Field of the Invention

The present invention relates generally to an oil recovery method and an oil recovery apparatus and, more particularly, to a method and apparatus for efficiently recovering oil spilled over the water surface of, for example, sea water by accidents or the like, by separating the oil from the water without using expensive and special recovery ships or recovery apparatuses of conventional types.

2. Background Information

Oil spilled over the ocean by oil field accidents, tanker accidents or the like has been recovered by special or multi-purpose recovery apparatuses for a suction-type oil recovery ship or a dredger-type oil recovery ship. However, since all of these apparatuses are expensive, the number of ships disposed at various areas, including harbors, is limited. Furthermore, large-sized facilities are required for mooring or storing these apparatuses. Additionally, if oil spill accidents or the like occur at areas far from the harbors in which these apparatuses are disposed, it becomes difficult to take immediate actions to conduct a recovery plan.

There is also known an excavating bucket system by which oil is recovered by skimming it using excavating buckets of floating cranes or gravel gathering and carrying ships (i.e., gut ships).

At the time of the heavy oil spill accident involving the oil tanker Nakhodka in the Japanese Sea in January 1997, various oil recovery machines were used. At that time, since the spilled oil was heavy oil having a high viscosity, suction-type oil recovery apparatuses were poor in efficiency, and the most efficient method of removing the oil was by skimming it with buckets of the gut ships. However, when using the excavating bucket system, a large amount of sea water and the like is recovered together with the spilled oil in a mixed state. Accordingly, since the recovery efficiency of the oil is low and a large amount of water is recovered together with the oil in a mixed state, the transport volume of the recovered oil is substantial, and the facilities (pits) on the land for receiving the recovered oil for post-treatment are required to be large in capacity.

Under such circumstances, as a method for more efficiently recovering oil as compared with the conventional methods, the present inventors have invented a bucket of a grab type having a slanting bottom plate and a shell provided with apertures or slits. The present inventors have filed Japanese Patent Application No. 130156 in 1999 covering the grab-type bucket together with a measurement technique for measuring oil viscosity and a method for oil recovery. However, from tests and observations made after such filing, it was found that before the oil and water are completely separated, a part of the oil tends to drop through the apertures or slits provided on the upper portion of the bucket. There is therefore a demand for a technique by which the water and oil are further securely separated.

Further, in a recovery operation using the foregoing grab-type bucket, in the step of closing the bucket, the water surface in the bucket is raised and the floating oil on the surface and the water may sometimes flow out of the bucket. Thus, there is also demand to further increase the recovery efficiency of the oil.

Moreover, with respect to heavy oil having a high viscosity, the foregoing grab-type bucket system can separate the oil and water efficiently depending upon the bucket. However, since tankers navigating the waters near the Sakhalin sea and the Okhotsk sea mostly carry crude oil, and the viscosity of crude oil is lower than that of heavy oil, a phenomenon has been seen that it is impossible to efficiently separate the oil and water. It was found that this phenomenon is attributable to the fact that in the case of crude oil, the time-lag between the drainage of water from the bucket and the start of dropping of the oil is short, while in the case of an oil having a low viscosity, the oil drops immediately after the dropping of water, whereby separation of the oil and water becomes difficult.

Further, when the spilled oil surging to the seashore is treated with heavy machines, the treated oil mostly forms a mixture with sand or gravel, and then forms a large amount of secondary contaminants, whereby secondary separation operations by manpower are required. Furthermore, in the secondary separation operations, since the separation of oil components adhered to the sand or the like is extremely difficult, it has been reported that the secondary contaminants are left as they are for a long period of time. Further, there have been reported serious examples of secondary pollution, for example, effusion of oil incorporated in sediments, and therefore there are few techniques for efficiently recovering a large amount of oil at the waterside.

SUMMARY OF THE INVENTION

The present invention has been made in view of the foregoing drawbacks in the conventional art.

It is an object of the present invention to provide an oil recovery method and an oil recovery apparatus by which spilled oil and water are efficiently separated at the initial step of the recovery operation to increase the recovery efficiency of the spilled oil.

It is another object of the present invention to provide a recovery apparatus of a bucket system type by which the separation of water and the spilled oil to be recovered can easily be confirmed and the recovery efficiency of oil only is high.

Still another object of the present invention is to provide an oil recovery apparatus which can be manufactured at low cost and can be easily transported to areas affected by oil spillage.

Another object of the present invention is to provide an oil recovery apparatus which can be housed in facilities that are simple and small-sized, since the apparatus is adapted for use only in emergencies such as oil spill accidents.

Still another object of the present invention is to provide an oil recovery method by which oil recovery is conducted efficiently while preventing water and sand from penetrating even if the recovery is made on the seashore or the like.

The foregoing and other objects of the present invention are carried out by an oil recovery method comprising the steps of skimming water and oil having a preselected viscosity and floating on the water surface using a bucket, separating the water and oil to a lower portion and an upper portion of the bucket, respectively, utilizing a difference in specific gravities thereof, draining the water located at the lower portion of the bucket through apertures disposed on a bottom plate of the bucket and having a preselected aperture diameter and length so that the oil located at the upper portion of the bucket gradually flows into the apertures at a rate in accordance with the oil viscosity after the water is drained, and discharging the oil from the bucket before the oil drains out of the apertures.

According to the present invention, the bottom plate of the bucket is mounted for undergoing movement between a closed position and an open position, and the discharging step comprises discharging the oil from the bucket by opening the bottom plate. In an alternative embodiment, the discharging step comprises discharging the oil from the bucket by inclining the bucket.

Thus the present invention relates to an improvement of a bucket for skimming the spilled oil, by which the oil and water can efficiently be separated and the recovery rate can be increased. This is accomplished by providing the apertures on the bottom plate of the bucket for the purpose of removing or taking out water from the skimmed mixture of oil and water to recover the oil only.

The present inventors have conducted various experiments with the apertures of on the bottom plate of the bucket for separating water from the mixture of oil and water. As a result, it was found that Hagen-Poiseuille's law is applicable as an approximate formula. In Hagen-Poiseuille's law, the flow rate per unit time can be determined by the viscosity of a liquid, the diameter of a tube, the length of the tube, and the pressure difference between both ends of the tube, and this relation is represented by the following formula:

$$((\pi a^4)/8\eta) \times ((P_1 - P_2)/1)$$

where "a" is the radius of a tube, "l" is the length of the tube, "$P_1 - P_2$" is the pressure difference between both ends of the tube, and "$\eta$" is the viscosity coefficient of a liquid.

The viscosity of oil is far higher than that of water. When the mixture of oil and water is skimmed by the bucket, they separate from each other so that water is located at the lower portion of the bucket and oil is located at the upper portion of the bucket by the difference in the specific gravities of oil and water. Then, the water located at the lower portion of the bucket rapidly drains away through the apertures. After the drainage of water, the oil which has a higher viscosity gradually moves downward into the apertures and does not drain away immediately after the drainage of water. Namely, before the oil starts to drain away from the apertures, there is a short period of time wherein the dropping of oil from the apertures stops. The present inventors intend to utilize the short period of time wherein the dropping stops to discharge the oil remaining in the bucket completely.

The short period of time wherein the dropping stops can be optionally set with the approximate formula of Hagen-Poiseuille's law by choosing the diameter and length of the apertures depending upon the viscosity of the oil to be recovered. The short period of time wherein the dropping of oil from the apertures does not yet start should be used for the operation time necessary to transport the bucket to a recovery tank or the like, in order to discharge the oil remaining in the bucket completely. This time is usually adjusted to be from about 10 to 40 seconds, preferably from about 20 to 30 seconds, taking the operation efficiency and the like into consideration.

It was confirmed by testing that the viscosity of crude oil is about $5 \times 10^3$ cSt (mm$^2$/s) after 3 days passed in a no-wind laboratory test condition. Furthermore, as a result of a test under an air-blowing condition in a laboratory, a state where the viscosity became at least about $5 \times 10^3$ cSt (mm$^2$/s) within 48 hours was confirmed. In nature, since the vaporization of volatile components is accelerated by wind and wave conditions, it is believed that the viscosity will mostly reach the foregoing numerical value after about 48 hours. Furthermore, by the emulsification due to waves, droplets and bubbles are mixed in the oil layer which achieves a mousse-like state, and the viscosity of the oil is thereby further increased, whereby the viscosity may often become at least about $10^4$ cSt (mm$^2$/s) within 48 hours.

It is considered that the recovery of spilled crude oil is accompanied by the dangers of ignition or injury to the health of individuals due to breathing of injurious gases or the like contained in the volatile components until the majority of the volatile components vaporize from the crude oil. Thus it is concluded that it is dangerous to start the recovery operation before the viscosity becomes at least about $5 \times 10^3$ cSt (mm$^2$/s).

Thus, in the state where the crude oil is not yet emulsified after the volatile components are vaporized from the crude oil, the viscosity of crude oil is at most $10^4$ cSt (mm$^2$/s) Accordingly, as the operable range when the crude oil that is not yet emulsified is recovered, it is preferred to set the level of oil viscosity to $10^3$ cSt (mm$^2$/s). Furthermore, as the operable range when the crude oil that is already emulsified is recovered, it is preferred to set the level of viscosity to $10^4$ cSt (mm$^2$/s).

If the aperture size of the bucket is too large, water will quickly drain away from the bucket and water and the dropping of oil will start before the bucket is transported to the recovery tank or the like. Accordingly, depending upon the operation time, it is preferred to adjust the aperture diameter to be from about 1 to 10 mm, more preferably from about 3 to 7 mm. Further, within usual operation time, it is preferred to adjust the aperture diameter to about 5 mm, by which it is possible to handle oil having a higher viscosity.

In the separation of water and oil, it is preferred to provide apertures each having a generally cylindrical shape and a length of from about 8 to 40 times the diameter of the aperture, depending upon the viscosity of the oil, to secure the time before the oil starts to drop after the completion of drainage of water from the apertures of the bucket. In usual cases, when the viscosity of oil is at a level of about $10^3$ cSt (mm$^2$/s), if the aperture diameter is set to be 3 mm, it is preferred to set the length of the apertures to be about 100 mm. Further, when the viscosity of oil is at a level of at least $10^4$ cSt (mm$^2$/s), if the aperture diameter is set to be 5 mm, it is preferred to set the length of the apertures to be about 43 mm.

BRIEF DESCRIPTION OF THE DRAWINGS

The foregoing summary, as well as the following detailed description of preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangement and instrumentalities shown. In the drawings.

DETAILED DESCRIPTION OF THE PREFERRED EMBODIMENTS

Figure 1:
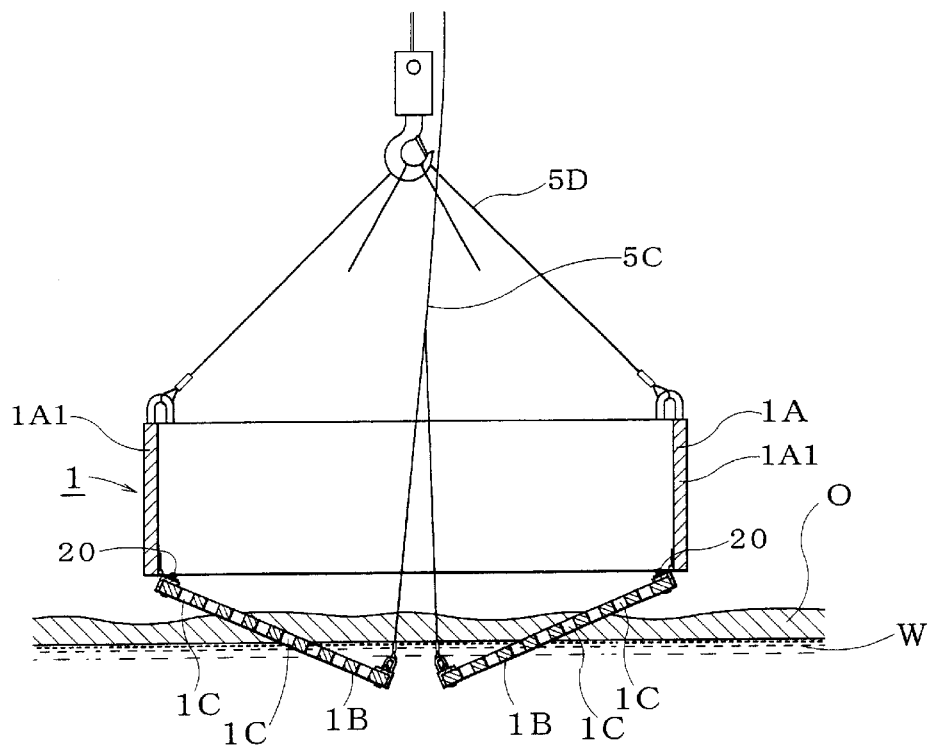
FIG. 1 is a vertical cross-sectional view of an oil recovery apparatus according to the present invention illustrating the state where a mixture of water and oil is skimmed with a bucket.

While this invention is susceptible of embodiments in many different forms, this specification and the accompanying drawings disclose only certain forms as examples of the use of the invention. The invention is not intended to be limited to the embodiments so described, and the scope of the invention will be pointed out in the appended claims.

An embodiment of an oil recovery method and oil recovery apparatus according to the present invention will be described below with reference to FIGS. 1–3. The oil recovery apparatus has a bucket generally designated at 1. The bucket 1 has a main body 1A of general cubic configuration. Right and left base plates 1B (hereinafter "bottom plates 1B") are each connected to a respective opposite side 1A1 of the main body 1A by a hinge 20 for undergoing pivotal movement in such a state that the bottom plates 1B can be opened downward like a double-leafed hinged door. Opening and closing of the bottom plates 1B is controlled by wind-up ropes 5C as described below. The bottom plates 1B form a flat base or bottom surface when they are in a closed state.

A preselected number of generally cylindrical apertures 1C are formed through each of the bottom plates 1B. The diameter and length of the apertures 1C are selected so as to allow separation of the oil O and water W utilizing the difference in viscosities of oil and water. When the viscosity of the oil O is at a level of $10^3$ cSt ($mm^2/s$), the diameter of the apertures 1C is preferably set to be 3 mm and the length of the apertures 1C is preferably set to be about 100 mm. When the viscosity of the oil O is at a level of at least $10^4$ cSt ($mm^2/s$), the diameter of the apertures 1C is set to be 5 mm and the length of the apertures 1C is set to be about 43 mm.

The number of apertures 1C selected for the bottom plates 1B is determined by the amount of water W to be taken into the bucket 1, which can be determined by calculating the volume of water in the bucket 1 by multiplying the height of the water in the bucket from the bottom plates 1B by the product of the length and width of the bucket 1. If the amount of water W taken into the bucket 1 varies, the drainage time of water also varies. However, for best operation efficiency, the number of apertures 1C is selected so that the drainage time of water will preferably be from about 10 to 40 seconds, more preferably from about 20 to 30 seconds.

For example, if the drainage time of water after the mixture of water W and oil O is skimmed is set to be about 25 seconds and the time before the bucket 1 is carried to the recovery tank after the drainage of water is set to be from about 10 to 20 seconds, in the case of light oil such as crude oil, the diameter of the apertures 1C should preferably be from about 1 to 2 mm and the length of apertures 1C should preferably be from about 30 to 60 mm. Further, in the case of recovering heavy oil, the diameter of the apertures 1C should preferably be from about 5 to 10 mm and the length of apertures 1C should preferably be about 40 mm. In each case, if the distance between the centers of respective apertures is set to be from about 2 to 6 times, usually about 4 times, of the diameter of the apertures 1C, and the height of the water taken into the bucket 1 is adjusted to be about 80 cm, the time required for the discharge of water is from about 20 to 25 seconds.

During an oil recovery operation, the bucket 1 is moved downward into the sea water surface in such a state that the bottom plates 1B are opened and the mixture of oil O and water W is skimmed with the bucket 1 (FIG. 1). After the floating oil O and the water W are taken into the bucket 1, the bottom plates 1B are closed and the bucket 1 is pulled up from the sea water (FIG. 2). While keeping the bottom plates 1B in a horizontal state, the oil O and the water W are separated by the difference in the specific gravity of the oil O and the water W so that the water is disposed at a lower portion of the bucket main body 1A and the oil is disposed at an upper portion of the bucket main body 1A.

Figure 3:
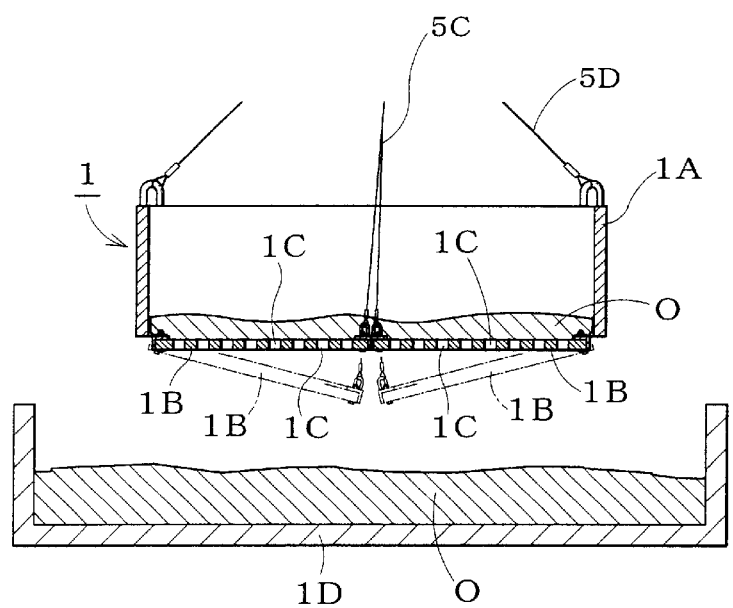
FIG. 3 is a vertical cross-sectional view illustrating the state where the oil is discharged into a recovery tank after the water in the bucket is drained.

Then, while above sea water level, the bucket 1 is moved toward an oil recovery tank 1D of a conventional type or the like (FIG. 3). In the meantime, the water W located at the lower portion in the bucket is drained downward from the apertures 1C of the bottom plates 1B. At this time, since the bottom plates 1B are kept in a horizontal state, the drainage of water W is maintained constant through each of the apertures 1C, whereby the time-lag from the completion of the drainage of water to the start of oil dropping is substantially the same in respective apertures 1C. As a result, the oil O will not enter any of the apertures 1C before drainage of the water W is completed, unlike conventional drainage mechanisms with a bucket having a slanting bottom plate provided with slits.

According to the present invention, the diameter and length of the apertures 1C are selected so that, following the completion of the drainage of the water W, the oil O, which has a preselected viscosity, will remain inside the bucket 1 and will not pass through and come out of the apertures 1C. Accordingly, the completion of the drainage of the water W can be confirmed by operator's naked eyes.

Thus, when the bucket 1 is positioned above the recovery tank 1D, the water W in the bucket would already have been drained from the apertures 1C, and the oil O is disposed in the tank in a state where it does not yet start to drop from the apertures 1C. Thereafter, by opening the bottom plates 1B, the oil O remaining in the bucket 1 is discharged into the recovery tank 1D (FIG. 3). In an alternative embodiment, the oil O is discharged by inclining the bucket 1 relative to the recovery tank 1D sufficiently to allow the oil to be discharged into the recovery tank 1D.

After drainage of the water W in the bucket 1 is completed, and before the oil O is discharged into the recovery tank 1D, it is possible that the oil O in the bucket 1 may sometimes enter the apertures 1C. However, since in a subsequent recovery operation the mixture of oil O and water W is taken into the bucket 1, any oil in the apertures 1C from a previous recovery operation can be removed simultaneously with the further drainage of water, thereby avoiding any operational problems.

By repeating the foregoing operations, the spilled oil can be securely and quickly recovered.

Figure 2:
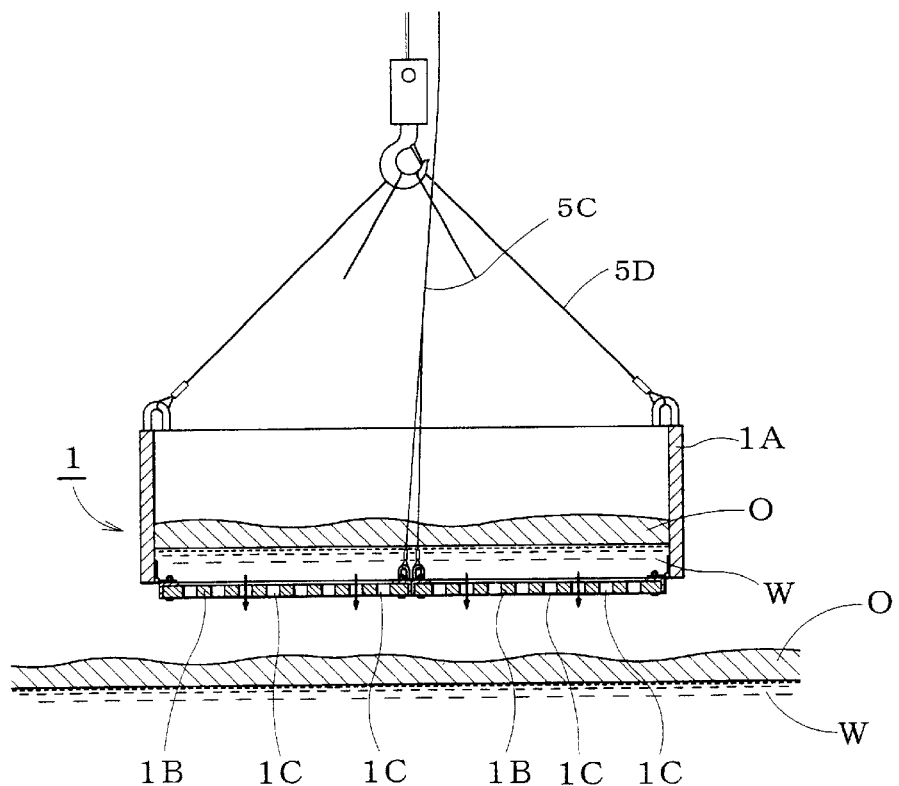
FIG. 2 is a vertical cross-sectional view illustrating the state where the bucket of FIG. 1 is pulled up from the water.

In the embodiment shown in FIGS. 1–3, the bucket main body 1A is generally square-shaped in cross-section. However, it is understood that other configurations which will allow the bucket main body 3A to adequately skim the earth and sand are suitable for the bucket main body 3A.

FIGS. 4–13 show various embodiments of oil recovery apparatuses for accomplishing the oil recovery method according to the present invention.

Figure 4:
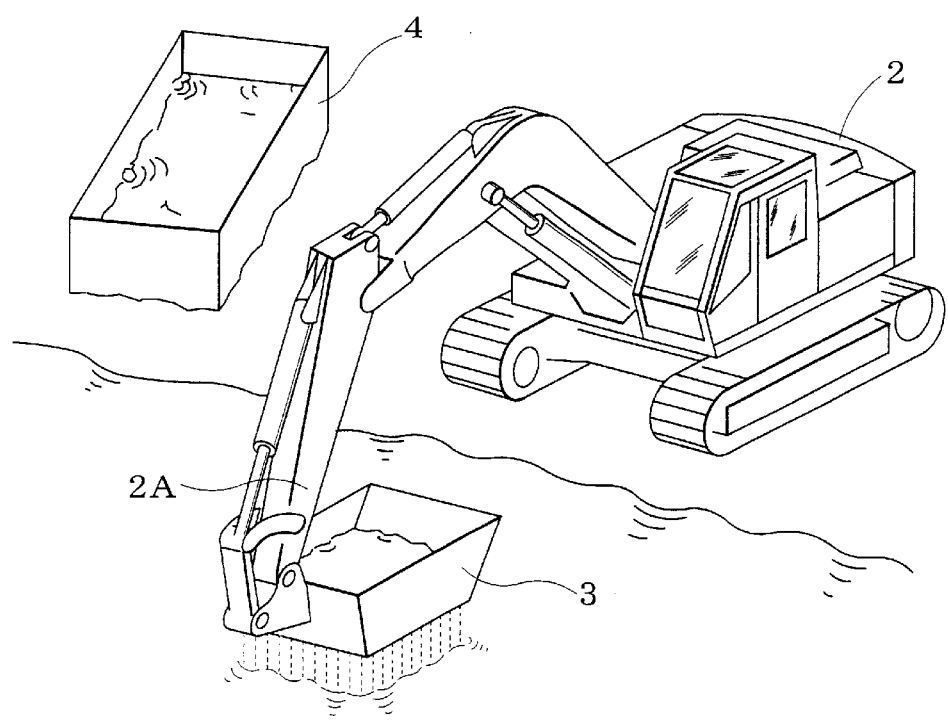
FIG. 4 is a perspective view illustrating the recovery of oil by an oil recovery apparatus according to the present invention.
Figure 5:
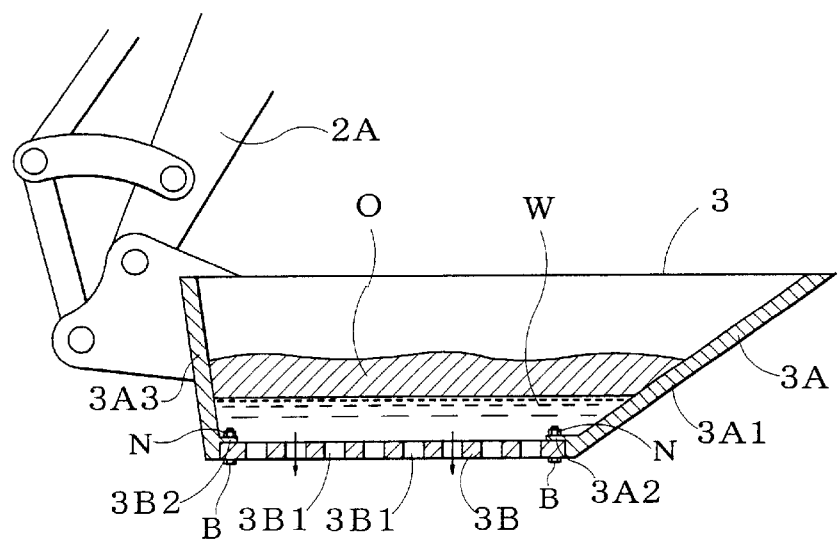
FIG. 5 is an enlarged vertical cross-sectional view of the bucket portion shown in FIG. 4.

FIG. 4–5 show an oil recovery apparatus according to the present invention comprising an excavating machine 2 having an arm 2A and a bucket 3 connected to the arm 2A. The excavating machine 2 is a conventionally known excavating machine, such as a backhoe, and, therefore, further description thereof is omitted. The bucket 3 is connected to the excavating machine 2 in a conventional manner so as to permit the bucket to be manipulated for various movements, including upward, downward and tilting movements. A recovery tank 4 of a conventional type is separately provided for storing the recovered oil. The recovery tank 4 is preferably generally box-shaped and has an adequate oil containing capacity.

Referring to FIG. 5, the bucket 3 has a bucket main body 3A and a base plate 3B (hereinafter "bottom plate 3B"). The bucket main body 3A preferably has a shape which will allow it to skim the water and associated earth and sand. In the embodiment shown in FIGS. 4–5, the bucket main body 3A is generally trapezoidal-shaped. However, it is understood that other shapes which will allow the bucket main body 3A to adequately skim the earth and sand are suitable for the bucket main body 3A.

The bottom plate 3B has opposite end portions connected to the bucket main body 3A. One of the end portions of the bottom plate 3B is connected to a flange or outer frame 3A2 extending from a slanted sidewall 3A1 of the bucket main body 3A using suitable connectors, such as a nut N and bolt B connection. The other end portion of the bottom plate 3B is connected to a flange or outer frame 3B2 extending from a sidewall 3A3 of the bucket main body 3A using a nut N and bolt B connection, for example. By this construction, the bottom plate 3B can be fixed to the bucket main body 3A during an oil recovery operation while allowing removal thereof for repair or cleaning operations or during a bottom plate exchange operation as further described below.

A preselected number of generally cylindrical-shaped apertures 3B1 are formed through the bottom plate 3B of the bucket 3 for separating oil and water utilizing the difference in the viscosities of the oil and water as described above for the embodiment shown in FIGS. 1–3. The preselected number of apertures 3B1 and the diameter and length of the apertures 3B1 are selected in accordance with the viscosity of the oil to be recovered as described above for the embodiment shown in FIGS. 1–3.

According to the present invention, a plurality of bottom plates 3B, each having any preselected number of apertures 3B1 with preselected lengths and diameters, are provided. A bottom plate 3B, among the plurality of bottom plates 3B provided, is selected for a specific oil recovery operation in accordance with the viscosity of the type of oil to be recovered.

An oil recovery operation using the foregoing apparatus shown in FIGS. 4–5 is conducted as follows. Before the start of the recovery operation, the viscosity of the oil O to be recovered is measured. A bottom plate 3B which is suitable for use with the type of oil to be recovered is selected and connected to the main body 3A of the bucket 3. The bucket 3 is then attached to the excavating machine 2. Thereafter, the excavating machine 2 is moved to a location where the oil O has spilled and floats on a surface of water W. The bucket 3 is then guided to skim the water W and the oil O floating on the water surface with the slanted sidewall 3A1 in the leading position. The bucket 3 is then pulled up over the water surface and turned while maintaining the bottom plate 3B in a horizontal orientation relative to the water surface. At this point, the water W picked-up by the bucket 3 is drained through the apertures 3B1 (FIG. 4). After completion of water drainage is confirmed by the operator (e.g., by observing the bucket 3 with the naked eye), the bucket 3 is positioned above the recovery tank 4 and the bucket 3 is tilted to discharge the oil O from the bucket 3 through slanted sidewall 3A1 into the recovery tank 4.

The foregoing operations are repeated successively to recover the spilled oil quickly and securely.

Figure 6:
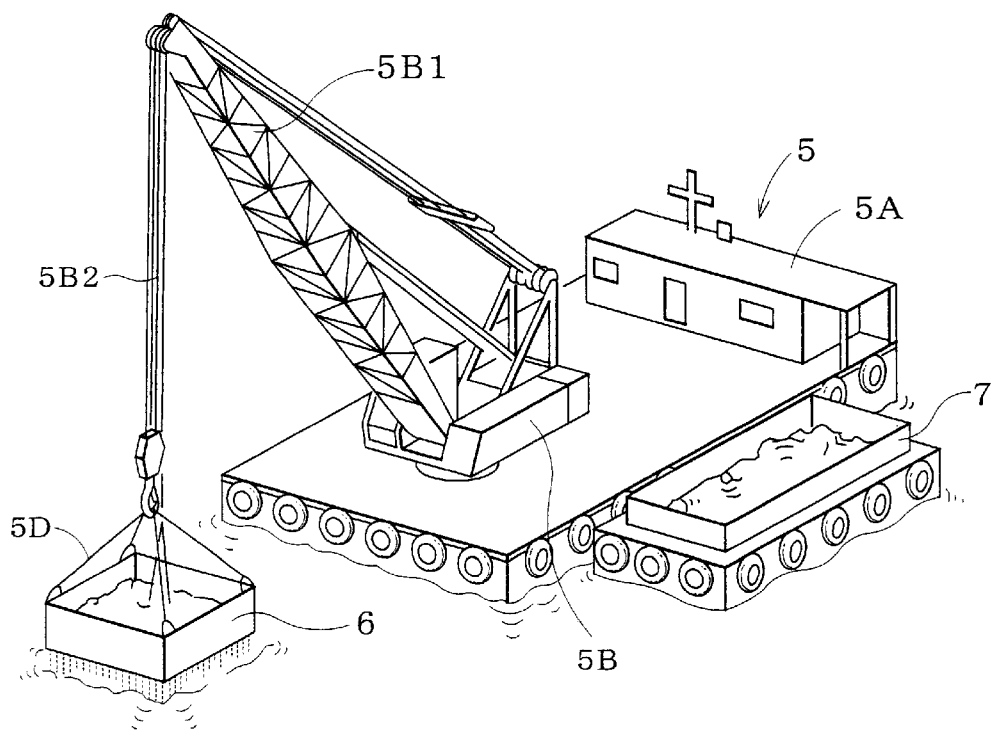
FIG. 6 is a perspective view illustrating the recovery of oil using a crane or a floating crane and a box-type bucket according to the present invention.
Figure 7:
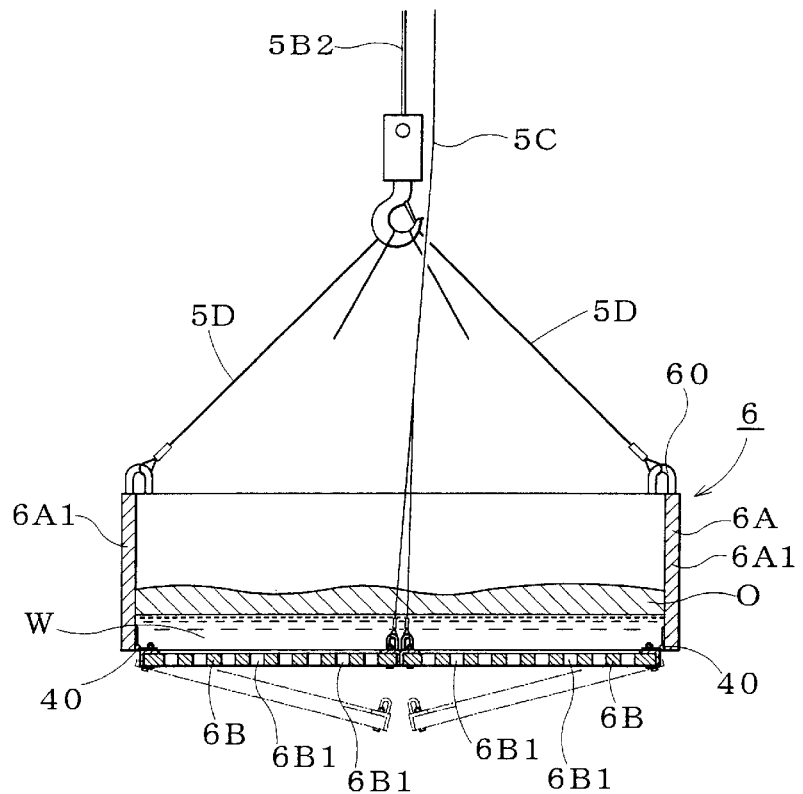
FIG. 7 is an enlarged vertical cross-sectional view of the box type bucket shown in FIG. 6.
Figure 8:
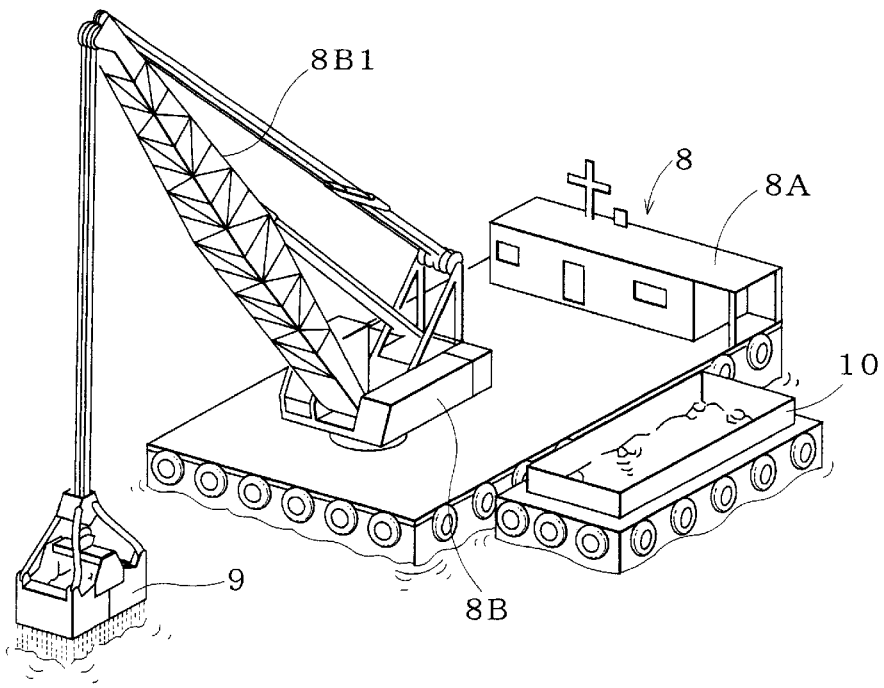
FIG. 8 is a perspective view illustrating the recovery of oil using a floating crane and a grab-type bucket according to the present invention.

FIG. 6–7 show an oil recovery apparatus according to the present invention comprising a floating crane structure 5 and a bucket 6 connected to the floating crane structure 5. The floating crane structure 5 comprises a floating structure 5A and a crane 5B having a boom or arm 5B1. The bucket 6 is suspended from the arm 5B1 by suspension ropes 5D and main wind-up ropes 5B2. The floating crane structure 5 is conventionally known and, therefore, further description thereof is omitted. The bucket 6 is connected to the floating crane structure 5 in a conventional manner so as to permit the bucket to be manipulated for various movements, including upward and downward movements. A recovery tank or carrier 7 of a conventional type is separately provided for storing the recovered oil. The recovery tank 7 is preferably generally box-shaped and has an adequate oil containing capacity.

Referring to FIG. 7, the bucket 6 has a main body 6A which is generally pillar-shaped. Right and left base plates 6B (hereinafter "bottom plates 6B") are each connected to a respective opposite side 6A1 of the main body 6A by a hinge 40 for undergoing pivotal movement in such a state that the bottom plates 6B can be opened downward like a double-leafed hinged door. Opening and closing of the bottom plates 6B is controlled by wind-up ropes 5C as described below. The bottom plates 6B form a flat base or bottom surface when they are in a closed state.

A preselected number of generally cylindrical apertures 6B1 are formed through each of the bottom plates 6B. The diameter and length of the apertures 6B1 are selected so as to allow separation of the oil O and water W utilizing the difference in viscosities of oil and water. The preselected number of apertures 6B1 and the diameter and length of the apertures 6B1 are selected in accordance with the viscosity of the oil to be recovered as described above for the embodiment shown in FIGS. 1–3.

According to the present invention, a plurality of bottom plates 6B, each having any preselected number of apertures 6B1 with preselected lengths and diameters, are provided. A bottom plate 6B, among the plurality of bottom plates 6B provided, is selected for a specific oil recovery operation in accordance with the viscosity of the type of oil to be recovered.

An oil recovery operation using the foregoing apparatus shown in FIGS. 6–7 is conducted as follows. Before the start of the recovery operation, the viscosity of the oil O to be recovered is measured. A bottom plate 6B which is suitable for use with the type of oil to be recovered is selected and connected to the main body 6A of the bucket 6. The bucket 6 is then attached to the arm 5B1 of the floating crane structure 5 by connecting suspension ropes 5D connected to connecting members 60 provided at an upper portion of the bucket 6 to main wind-up rope 5B2 of the floating crane structure 5 an by connecting the bottom plates 6B to messenger wind-up ropes 5C.

The floating crane structure 5 is then transported to an oil recovery site and the bucket 6 is pulled up above the surface of water W where oil has spilled and floats on the water surface. The messenger wind-up ropes 5C are loosened to open the bottom plates 6B and the bucket 6 is gradually dropped on the water surface. The bucket 6 is then submerged to a depth where the upper portion of the bucket 6 is not be beneath the water surface. At this point, the messenger wind-up ropes 5C are wound up to close the bottom plates 6B. The main wind-up rope 5B2 is then wound up to pull up the bucket 6 from the water surface to skim the oil O floating on the water surface together with the water W. At this point, the water W picked-up by the bucket 6 is drained through the apertures 6B1. After completion of water drainage is confirmed by the operator (e.g., by observing the bucket 6 with the naked eye), the bucket 6 is positioned above the recovery tank 7 and the messenger wind-up ropes 5C are loosened to open the bottom plates 6B to discharge the oil O into the recovery tank 7. In an alternative embodiment, the bucket 6 can be tilted to discharge the oil O from the bucket 6 into the recovery tank 7.

The foregoing operations are repeated successively to recover the spilled oil quickly and securely.

FIG. 8–13 show an oil recovery apparatus according to the present invention comprising a floating crane structure 8 and a grab-type bucket 9 connected to the floating crane structure 8. The floating crane structure 8 comprises a floating structure 8A and a crane 8B having a boom or arm 8B1. The grab-type bucket 9 is suspended from the arm 8B1 by suspension ropes. The floating crane structure 8 is conventionally known and, therefore, further description thereof is omitted. The grab-type bucket 9 is connected to the floating crane structure 8 in a conventional manner so as to permit the grab-type bucket to be manipulated for various movements, including upward, downward and tilting movements. A recovery tank or carrier 10 of a conventional type is separately provided for storing the recovered oil. The recovery tank 10 is preferably generally box-shaped and has an adequate oil containing capacity.

Figure 9:
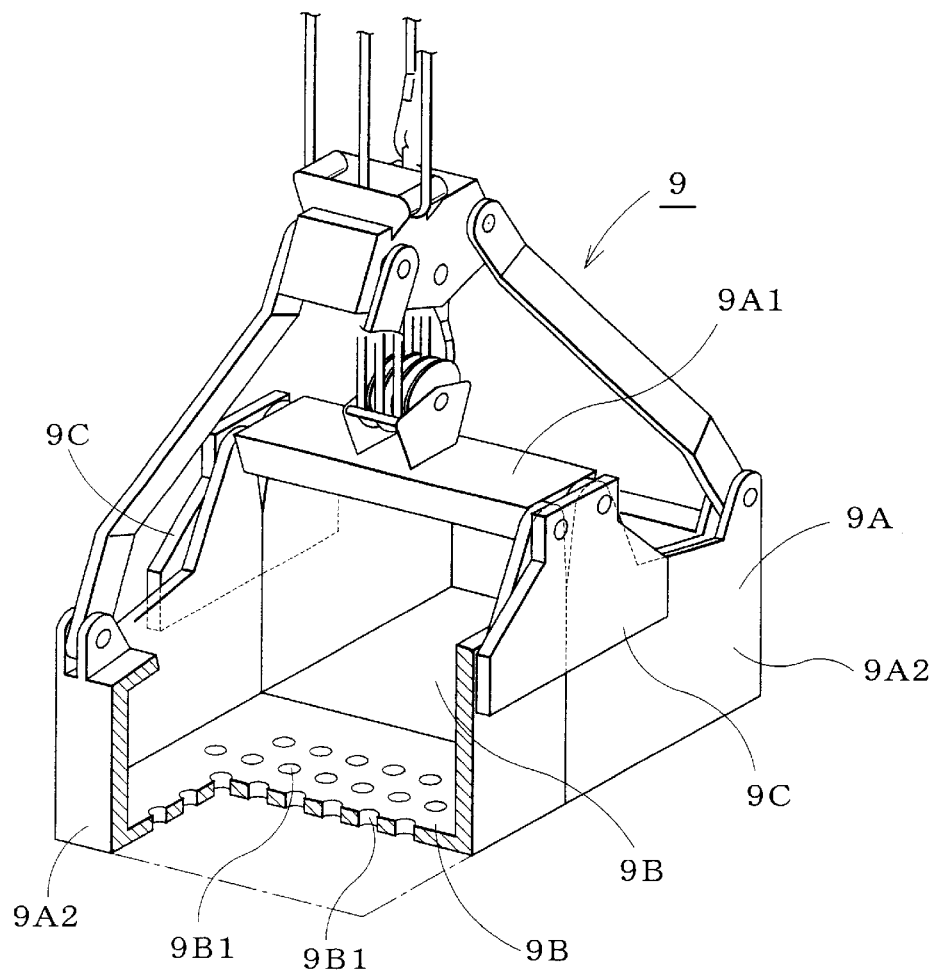
FIG. 9 is an enlarged perspective view of the grab-type bucket shown in FIG. 8 with parts broken away.
Figure 10:
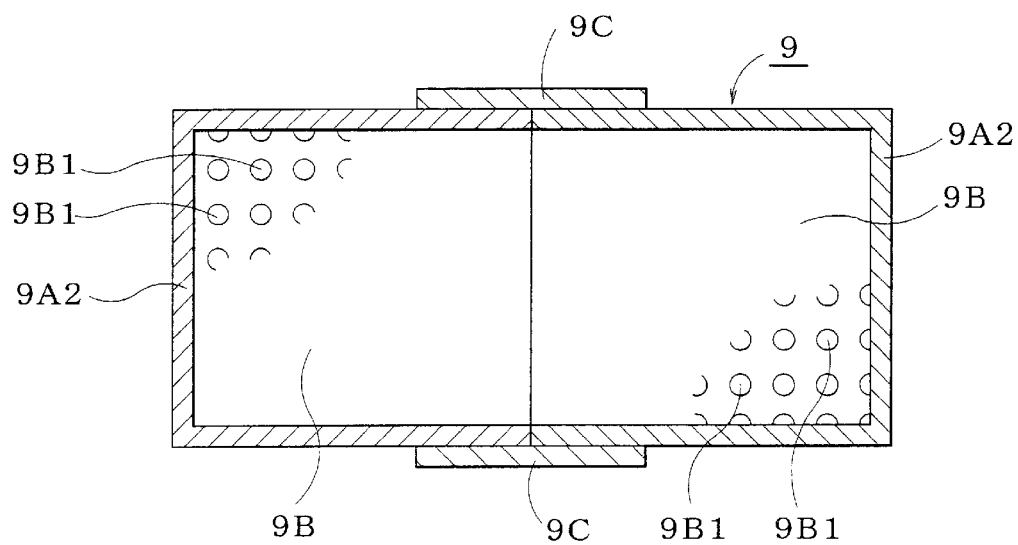
FIG. 10 is a horizontal cross-sectional view of the grab-type bucket shown in FIG. 9.
Figure 11:
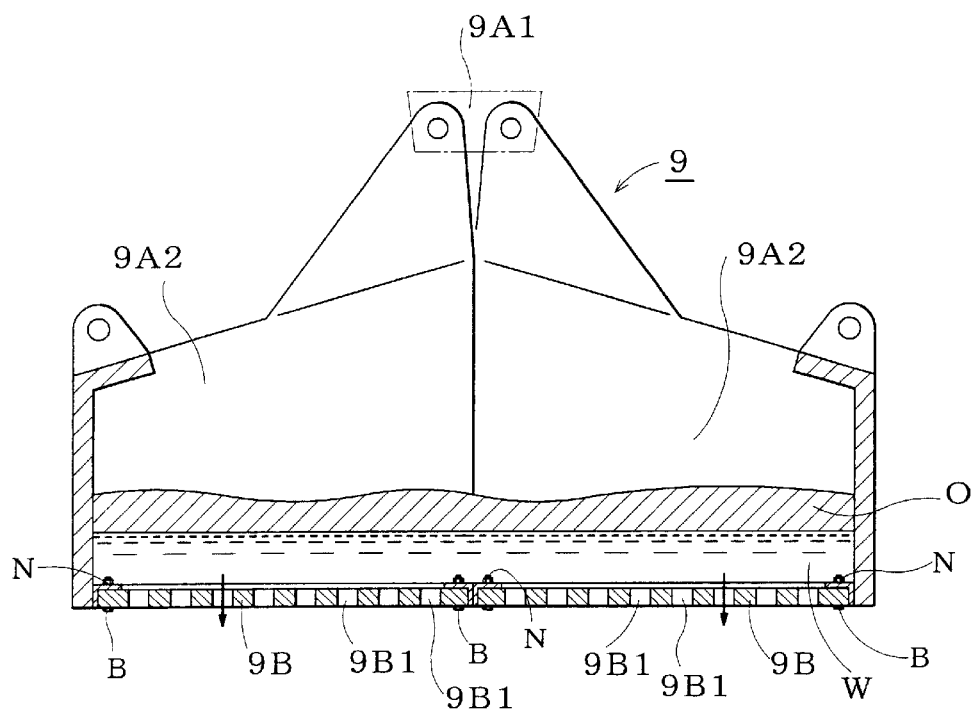
FIG. 11 is a vertical cross-sectional view of the grab-type bucket shown in FIG. 9.

Referring to FIGS. 9–11, the grab-type bucket 9 has a bucket main body 9A, base or bottom plates 9B and leakage-preventing plates 9C. The bucket main body 9A is provided with a frame 9A1 which extends forward and rearward in the plane view, and two shells 9A2 each connected to an end portion of the frame 9A1 for undergoing pivotal movement in such a state that the shells 9A2 can be opened downward and closed like a double-leafed hinged door. The shape of the shells 9A2 is selected so as to permit skimming of earth and sand.

In the embodiment shown in FIG. 9, each of the bottom plates 9B is preferably formed in one piece with a respective one of the shells 9A2. In an alternative embodiment, as shown in FIG. 11, the bottom plates 9B may be formed separately from the shells 9A2 and connected to the shells 9A2 using suitable connecting means, such as bolts B and nuts N.

A preselected number of generally cylindrical apertures 9B1 are formed through each of the bottom plates 9B. The diameter and length of the apertures 9B1 are selected so as to allow separation of the oil O and water W utilizing the difference in viscosities of oil and water. The preselected number of apertures 9B1 and the diameter and length of the apertures 9B1 are selected in accordance with the viscosity of the oil to be recovered as described above for the embodiment shown in FIGS. 1–3. According to the present invention, a plurality of bottom plates 9B, each having any preselected number of apertures 9B1 with preselected lengths and diameters, are provided. A bottom plate 9B, among the plurality of bottom plates 9B provided, is selected for a specific oil recovery operation in accordance with the viscosity of the type of oil to be recovered.

The leakage-preventing plates 9C extend downward from both ends of the frame 9A1 and are disposed at front and rear surfaces of the shells 9A2. By this construction, leakage of oil during rise of the water surface in the grab-type bucket during a skimming operation can be prevented, whereby the recovery efficiency is increased.

Figure 12:
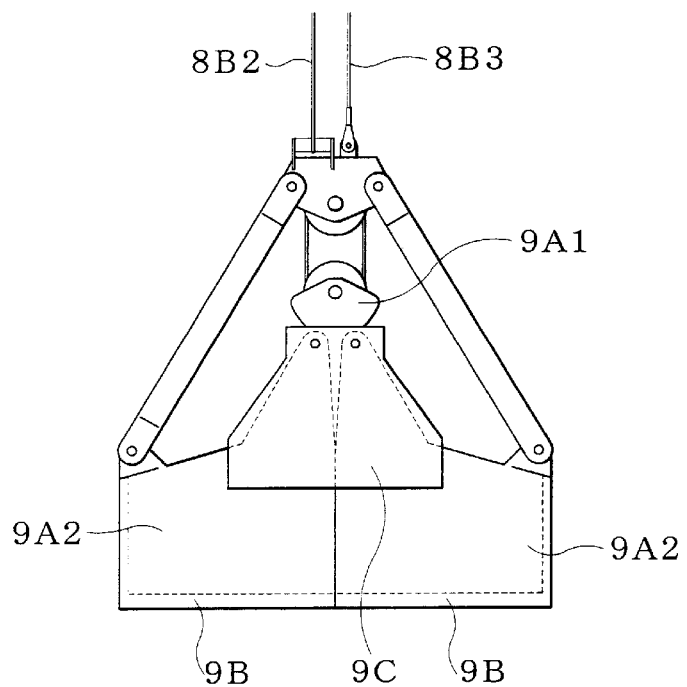
FIG. 12 is a front view of the state where shells of the grab-type bucket shown in FIG. 9 are closed.
Figure 13:
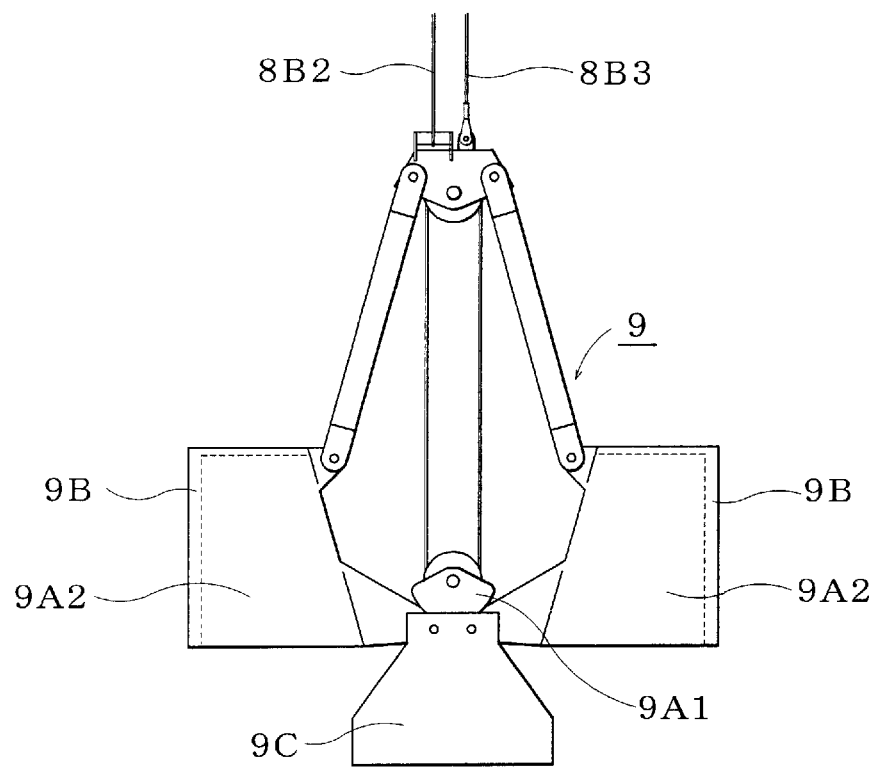
FIG. 13 is a front view of the state where shells of the grab-type bucket shown in FIG. 9 are opened.

An oil recovery operation using the foregoing apparatus shown in FIGS. 9–13 is conducted as follows. Before the start of the recovery operation, the viscosity of the oil O to be recovered is measured and bottom plates 9B which are suitable for use with the type of oil to be recovered is selected and connected to the lower portion of the main body 9A of the grab-type bucket 9. The grab-type bucket 9 is then attached to the floating crane structure 8 which is transported to an oil recovery site. The grab-type bucket 9 is then pulled up above the surface of water where oil has spilled and floats on the water surface. Messenger wind-up ropes 8B2 are then loosened to open the shells 9A2 (and thus the bottom plates 9B) and the grab-type bucket 9 is gradually dropped on the water surface. Then the messenger wind-up ropes 8B2 are operated to close the shells 9A2 so that the oil O and water W will be skimmed (FIG. 12 and FIG. 13). By operating a main wind-up machine of the crane 8B, a main wind-up rope 8B3 is wound up, and the crane 8B is turned while the grab-type bucket 9 is maintained above the water surface. At this point, the water W picked-up by the grab-type bucket 9 is drained through the apertures 9B1. After completion of water drainage is confirmed by the operator (e.g., by observing the grab-type bucket 9 with the naked eye), the grab-type bucket 9 is positioned above the recovery tank 10 and the messenger wind-up ropes 8A2 are loosened to open the shells 9A2 to discharge the oil O into the recovery tank 10 (FIGS. 11 and 12).

The foregoing operations are repeated successively to recover the spilled oil quickly and securely.

Thus, as described above, each of the bottom plates is provided with a preselected number of generally cylindrical apertures. The diameter and length of the apertures are selected so as to allow separation of the oil and water utilizing the difference in viscosities of oil and water. The preselected number of apertures and the diameter and length of the apertures are selected in accordance with the viscosity of the oil to be recovered as described above for the embodiment shown in FIGS. 1–3. Moreover, according to the present invention, a plurality of the bottom plates, each having any preselected number of apertures with preselected lengths and diameters, are provided. A bottom plate, among the plurality of bottom plates provided, is selected for a specific oil recovery operation in accordance with the viscosity of the type of oil to be recovered.

In the embodiments of the oil recovery apparatus described above with reference to FIGS. 1–13, each of the bottom plates 1B, 3B, 6B and 9B comprises a single sheet of metal plate, such as a steel plate, with the cylindrical apertures perforated therethrough using any a suitable conventional method. In this construction, the thickness of the metal plate corresponds to the length of the cylindrical apertures. The use of a single sheet of metal plate for the bottom plate is preferred when the length of the apertures is set to be in the lower range described above for the embodiment of FIGS. 1–3. However, when the diameter selected for the apertures is in the range of 1 to 10 mm and the length is in the higher range (e.g., about 100 mm), it becomes difficult to perforate the plate to form the apertures.

FIGS. 14–17 show alternative embodiments of the structure of the bottom plates 1B, 3B, 6B and 9B described above with reference to the embodiments of FIGS. 1–3, 4–5, 6–7 and 8–13, respectively, which facilitate the construction of bottom plates having lengths in the higher range (e.g., about 100 mm).

Figure 14:
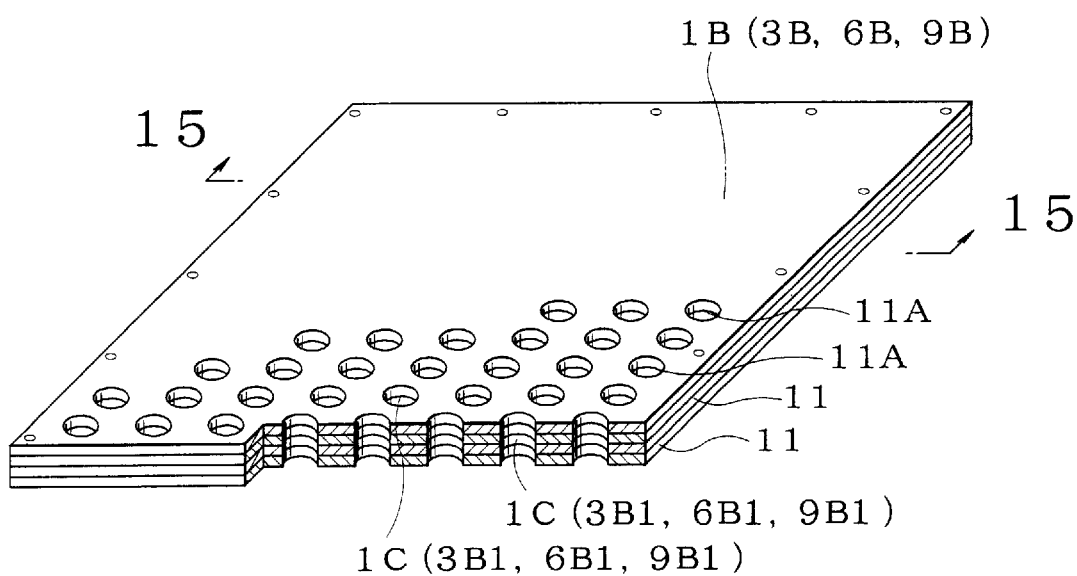
FIG. 14 is an enlarged perspective view, with parts broken away, illustrating the cylindrical apertures of the bottom plate of the bucket according to an embodiment of the present invention.
Figure 15:
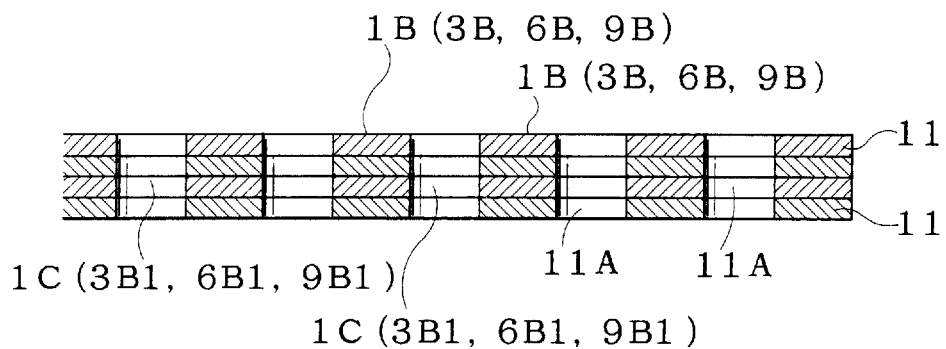
FIG. 15 is a partial enlarged cross-sectional view along line 15—15 of FIG. 14.

In the embodiment shown in FIGS. 14–15, each of the bottom plates comprises a plurality of stacked metal plates (e.g., steel plates) 11 having apertures 11A. The apertures 11A are formed on the metal plates 11 prior to stacking and are positioned so that when the metal plates 11 are stacked, corresponding apertures 11A in the stacked metal plates are aligned and form the apertures 11A. The thickness of the stacked metal plates 11 corresponds to the preselected height of the apertures 11A. The stacked metal plates 11 are connected together using suitable connecting means, such as nuts and bolts. Appropriate apertures are also formed on the metal plates 11 for connecting the resulting bottom plate to the bucket using suitable connecting means (e.g., nuts and bolts) as described above.

The bottom plate having the construction shown in FIGS. 14–15 can be used effectively with the bucket of the oil recovery system according to the present invention. However, the effectiveness of this bottom plate construction may be deteriorated when the apertures 11A are not properly aligned with one another, when rusting forms in the space between the stacked metal plates 11, and when the thickness, and thus the overall weight, of the bottom plate increases.

Figure 16:
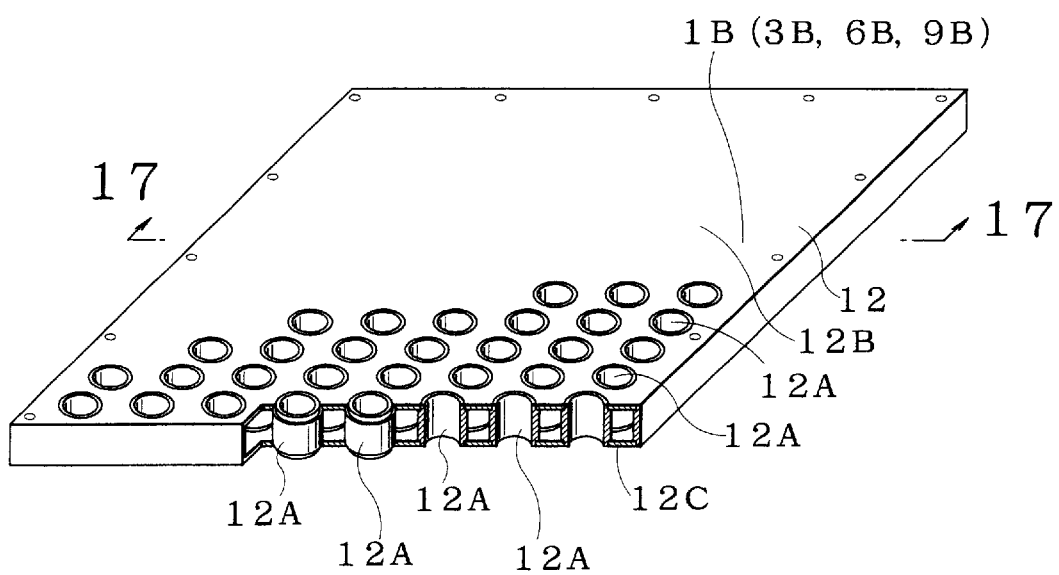
FIG. 16 is an enlarged perspective view, with parts broken away, illustrating the state of cylindrical apertures of the bottom plate of the bucket according to another embodiment of the present invention.
Figure 17:
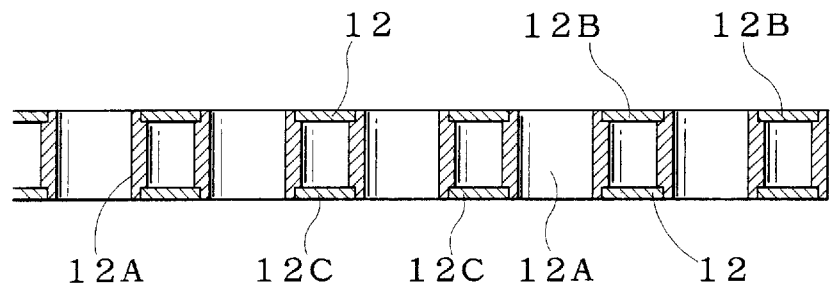
FIG. 17 is a partial enlarged cross-sectional view along line 17—17 of FIG. 16.

FIGS. 16–17 show an alternative embodiment of the structure of the bottom plates 1B, 3B, 6B and 9B described above with reference to the embodiments of FIGS. 1–3, 4–5, 6–7 and 8–13, respectively, which avoids the potential problems associated with the bottom plate shown in FIGS. 14–15. In this embodiment, a bottom plate 12 comprises upper and lower metal plates (e.g., steel plates) 12B, 12C connected together in spaced-apart relation at a preselected distance. The upper and lower metal plates 12B, 12C are perforated and a plurality of pipe members 12A are disposed between the upper and lower metal plates and form the apertures of the bottom plate 12. The distance between the upper and lower plates 12B, 12C corresponds to the length of each of the pipe members 12A and, therefore, the length of each aperture. The diameter and length of the pipe members 12A are selected so as to allow separation of the oil and water utilizing the difference in viscosities of oil and water. Furthermore, the number of apertures and the diameter and length of the apertures are selected in accordance with the viscosity of the oil to be recovered as described above for the embodiment shown in FIGS. 1–3. Appropriate apertures are also formed on the upper and lower metal plates 12B, 12C for connecting the resulting bottom plate to the bucket using suitable connecting means (e.g., nuts and bolts) as described above. Preferably, the upper and lower plates and the pipe members are made of a material which does not rust easily, such as stainless steel.

By the foregoing construction, since the apertures of the bottom plate are formed by pipe members, water does not penetrate into the space between the upper and lower metal plates, thereby preventing rusting. Furthermore, the weight of the bottom plate is substantially reduced, thereby permitting use of the bottom plate in buckets having a large capacity.

In the foregoing embodiments, the apertures of the bottom plates are generally cylindrical-shaped. However, it is understood by those of ordinary skill in the art that the apertures can have shapes other than cylindrical, such as, for example, a square pillar shape or an oval pillar shape.

According to the present invention, an oil recovery apparatus has a bucket provided with one or more bottom plates having apertures with a diameter and length selected so as to allow separation of the oil (e.g., crude oil or heavy oil) and water utilizing the difference in viscosities of oil and water. Thus, it is possible to simply and securely separate the spilled oil from the co-existing mixed water, and to collect the oil with extremely high recovery efficiency and within a short period of time. Furthermore, since it becomes possible to transport the recovered oil as it is to a treating apparatus without pre-treatment in certain cases, the treatment time and costs can be substantially reduced.

According to the present invention, in the recovery operation, after the water is drained from the bucket, a substantial time-lag can be given before the oil starts to drop from the apertures. It is therefore possible to confirm the drainage of water through the apertures using the naked eye and then deliver the oil to the recovery tank or recovery carrier without dropping the oil on the water.

When the oil is recovered using an excavating machine described above according to the present invention, it is possible to efficiently recover the oil surging to the seashore and to greatly reduce the manpower required for the recovery. Further, in the case of necessity, by supplementing the oil recovery method of the present invention with appropriate manpower, it is possible to increase the recovery efficiency of the oil and shorten the recovery time.

When the oil is recovered using a crane structure, such as a floating crane, and a box-type bucket, the box-type bucket can be easily fabricated at the working site without special knowledge or skill due to its simple construction. Furthermore, since the box-type bucket according to the present invention is light in weight, it can be produced at low costs and can be quickly transported to the desired site in emergency situations. Furthermore, since the box-type bucket can be fabricated at low costs, a substantial number of buckets of this type can be disposed at various areas where oil spill accidents and the like are predicted.

The grab-type and box-type buckets of the oil recovery apparatus according to the present invention preferably have a height, width and depth (e.g., preferably each about 5 m) which permit quick dismantling and storage thereof in long term facilities that are small in size and simple in construction.

According to the present invention, the recovery of oil can be made efficiently by attaching the bucket to the generally and widely used cranes and excavating machines. Accordingly, recovery costs can be reduced remarkably as compared with conventional recovery apparatuses.

From the foregoing description, it can be seen that the present invention comprises an improved oil recovery method and an improved oil recovery apparatus. It will be appreciated by those skilled in the art that obvious changes can be made to the embodiments described in the foregoing description without departing from the broad inventive concept thereof. It is understood, therefore, that this invention is not limited to the particular embodiments disclosed, but is intended to cover all obvious modifications thereof which are within the scope and the spirit of the invention as defined by the appended claims.

We claim:

1. A method for recovering oil, comprising the steps of: skimming water and oil having a preselected viscosity and floating on the water surface using a bucket; separating the water and oil to a lower portion and an upper portion of the bucket, respectively, utilizing a difference in specific gravities thereof; draining the water located at the lower portion of the bucket through apertures disposed on a bottom plate of the bucket and having a preselected aperture diameter and length so that the oil located at the upper portion of the bucket gradually flows into the apertures at a rate in accordance with the oil viscosity after the water is drained; and discharging the oil from the bucket before the oil drains out of the apertures.

2. A method according to claim 1; wherein the bottom plate of the bucket is mounted for undergoing movement between a closed position and an open position.

3. A method according to claim 2; wherein the discharging step comprises discharging the oil from the bucket by opening the bottom plate.

4. A method according to claim 2; wherein the discharging step comprises discharging the oil from the bucket by inclining the bucket.

5. A method according to claim 1; wherein the discharging step comprises discharging the oil from the bucket by inclining the bucket.

6. A method according to claim 1; wherein in the draining step the water is drained for a period of from 10 to 40 seconds; and wherein the period of time elapsed between the point when the water completely drains from the bucket and before the oil drains out of the apertures is from 10 to 40 seconds.

7. A method for recovering oil, comprising the steps of: providing a bucket having a main body and a base plate connected to the main body for undergoing pivotal movement relative to the main body to open and close the base plate, the base plate having a plurality of apertures having a preselected diameter and length sufficient to allow separation of oil and water in a mixture of water and oil floating on the surface of the water utilizing differences in specific gravities and viscosities of the oil and the water; skimming the water and the oil floating on the water surface using the bucket; allowing the water to drop and drain out of the bucket through the apertures of the base plate while the base plate is maintained horizontal relative to the water surface; and opening the base plate of the bucket to discharge the oil into an oil recovery tank before the oil begins to drain out of the apertures of the base plate of the bucket.

8. A method according to claim 7; wherein the apertures of the base plate are generally cylindrical-shaped.

* * * * *